(12) United States Patent
Li et al.

(10) Patent No.: US 12,465,962 B1
(45) Date of Patent: Nov. 11, 2025

(54) WASTEWATER TREATMENT DEVICE, DOCKING STATION FOR CLEANING ROBOT AND CLEANING SYSTEM

(71) Applicant: TP-Link Systems Inc., Irvine, CA (US)

(72) Inventors: Wen Li, Shenzhen (CN); Nengfeng Zhang, Shenzhen (CN); Ning Cheng, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 19/035,801

(22) Filed: Jan. 23, 2025

(51) Int. Cl.
*B08B 9/087* (2006.01)
*A47L 11/40* (2006.01)

(52) U.S. Cl.
CPC ............ *B08B 9/087* (2013.01); *A47L 11/4091* (2013.01); *A47L 2201/02* (2013.01); *B08B 2209/08* (2013.01)

(58) Field of Classification Search
CPC ....... B08B 9/08; B08B 9/0808; B08B 9/0856; B08B 9/087; B08B 9/36; B08B 2209/08; A47L 11/4091; A47L 2201/00; A47L 2201/02
See application file for complete search history.

(56) References Cited

U.S. PATENT DOCUMENTS

| | | | | |
|---|---|---|---|---|
| 958,876 | A * | 5/1910 | Jones | F16L 41/14 285/179 |
| 2,182,680 | A * | 12/1939 | Rugg | E01B 27/102 15/104.095 |
| 5,349,716 | A * | 9/1994 | Millar | A47L 1/06 15/245 |

FOREIGN PATENT DOCUMENTS

| | | | |
|---|---|---|---|
| CN | 116998947 A | 11/2023 | |
| CN | 220811931 U | 4/2024 | |
| CN | 118614810 A | 9/2024 | |
| WO | WO-2024056033 A1 * | 3/2024 | ........ A47L 11/4091 |

OTHER PUBLICATIONS

Machine Translation of Sun et al., WO-2024056033-A1, Mar. 2024. (Year: 2024).*

* cited by examiner

*Primary Examiner* — David G Cormier
(74) *Attorney, Agent, or Firm* — Loeb & Loeb LLP

(57) ABSTRACT

The present disclosure provides a wastewater treatment device for a docking station for a cleaning robot, including: a wastewater tank, including a discharge opening at its bottom; an actuator; a blade, being actuated by the actuator to rotate in a wastewater tank; wherein the blade has an accessory part, the accessory part being pressed to a first position when contacting with the bottom of the wastewater tank, and being elastically biased to a second position extending into the discharge opening of the wastewater tank when located in the discharge opening.

20 Claims, 3 Drawing Sheets

WASTEWATER TREATMENT DEVICE, DOCKING STATION FOR CLEANING ROBOT AND CLEANING SYSTEM

TECHNICAL FIELD

The present disclosure relates to a wastewater treatment device, a docking station for a cleaning robot and a cleaning system.

BACKGROUND

Cleaning system comprising autonomous cleaning robots have gained widespread adoption across residential homes, offices, and industrial settings for their ability to perform sweeping and/or mopping tasks on various floor surfaces. A conventional cleaning system comprises a cleaning robot and a docking station for the robot.

Existing docking stations offer convenience of automatic cleaning of mopping pads by supplying clean water stored in a clean water tank to rinse the mopping pads and collecting used water into a wastewater tank. However, the requirement for periodic manual replenishment of the clean water tank and emptying of the wastewater tank may be inconvenient and laborious for users, and the wastewater stored in the wastewater tank for extended periods is prone to developing unpleasant odors, which not only affects the user experience but also necessitates frequent and unpleasant cleaning tasks.

There may be some techniques to evaporate wastewater for water recycling, however, during such process, solid waste is generated on the bottom of the wastewater tank, which needs to be discharged from a discharge opening of the wastewater tank.

There is a need for an improved mechanism for handling the solid waste generated during wastewater recycling at the docking station to enhance the user experience.

SUMMARY

In view of the problems and demands mentioned above, the present disclosure proposes a new technical scheme, which solves the above problems and brings other technical effects by adopting the following technical features.

According to one embodiment of the present disclosure, a wastewater treatment device for a docking station for a cleaning robot is provided, the wastewater treatment device comprising: a wastewater tank, comprising a discharge opening at its bottom; an actuator; a blade, being actuated by the actuator to rotate in a wastewater tank; wherein the blade has an accessory part, the accessory part being pressed to a first position when contacting with the bottom of the wastewater tank, and being elastically biased to a second position extending into the discharge opening of the wastewater tank when located in the discharge opening.

According to another embodiment of the present disclosure, a docking station for a cleaning robot is provided, the docking station comprising: a wastewater treatment device, comprises: a wastewater tank, comprising a discharge opening at its bottom; an actuator; a blade, being actuated by the actuator to rotate in a wastewater tank; wherein the blade has an accessory part, the accessory part being pressed to a first position when contacting with the bottom of the wastewater tank, and being elastically biased to a second position extending into the discharge opening of the wastewater tank when located in the discharge opening.

According to another embodiment of the present disclosure, a cleaning system is provided, comprising: a cleaning robot; a docking station for the cleaning robot, comprising: a wastewater treatment device comprises: a wastewater tank, comprising a discharge opening at its bottom; an actuator; a blade, being actuated by the actuator to rotate in a wastewater tank; wherein the blade has an accessory part, the accessory part being pressed to a first position when contacting with the bottom of the wastewater tank, and being elastically biased to a second position extending into the discharge opening of the wastewater tank when located in the discharge opening.

The present disclosure incorporates the accessory part on the blade that may be biased to automatically clean the solid waste in the discharge opening when the blade moves to the discharge opening. In other words, the present disclosure provides a passive waste cleaning mechanism, which may clean the solid waste in the discharge opening through elastic bias of the accessory part between the first position and the second position.

BRIEF DESCRIPTION OF THE DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
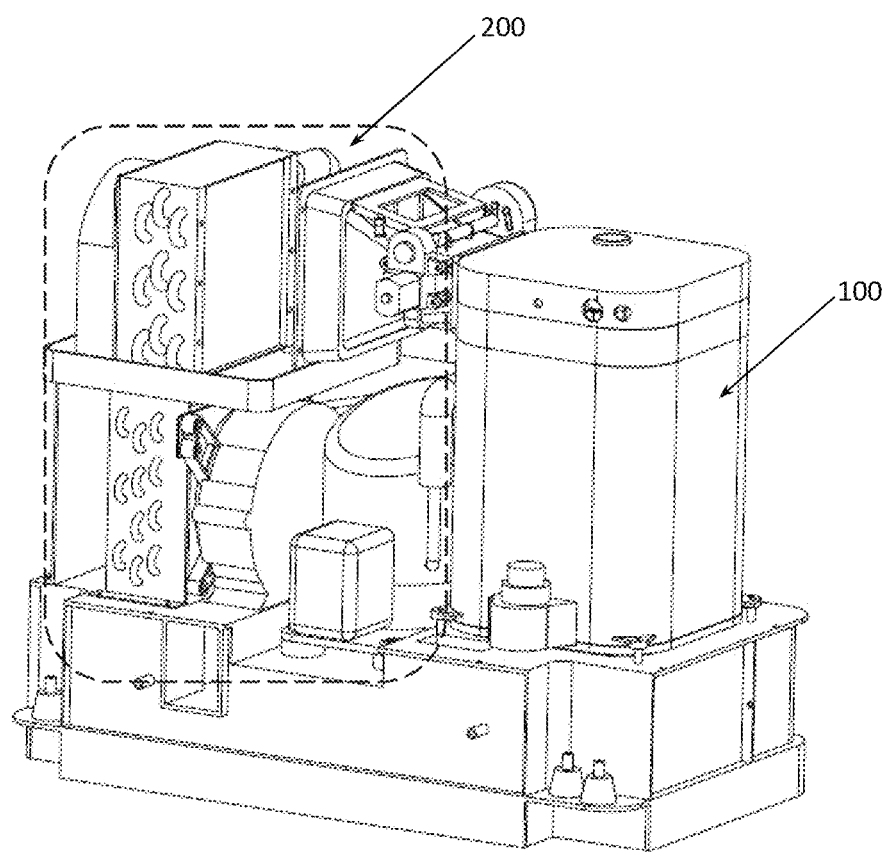
FIG. 1 shows a docking station for a cleaning robot according to an embodiment of the present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "top", "bottom", "internal", "external", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, and cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect connections.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the meanings of the above terms in the present disclosure may be understood on a case-by-case basis.

In addition, technical features involved in different embodiments of the present disclosure may be combined with each other as long as no conflicts occur therebetween.

According to embodiments of the present disclosure, the docking station of a cleaning system may comprise a wastewater treatment device and a clean water generation device etc. The wastewater treatment device process the wastewater and generates solid waste. The wastewater treatment device may also comprise a rotating blade for scraping and breaking the solid waste into smaller pieces, which may be discharged as dry debris through a discharge opening provided at the bottom of the wastewater treatment device.

As depicted in FIG. 1, the docking station, according to an embodiment of the present disclosure, is designed with the capability to autonomously process wastewater and produce clean water, which eliminates the need for manual operations of clean water replacement and wastewater discharge. As shown in FIG. 1, the docking station comprises a wastewater treatment device 100, which collects the wastewater generated from washing the mopping pads of the cleaning robot, e.g., after the robot finishes a current cleaning cycle and docks at the docking station. The wastewater may be distilled at the wastewater treatment device 100 for generating clean water, which may be later stored in a clean water tank of the docking station (which is configured to hold a supply of clean water) and/or supplied to the cleaning robot for a next cleaning cycle.

Accordingly, the wastewater treatment device 100 incorporates an evaporation or distillation mechanism that facilitates the removal of water content, leading to the concentration of solid waste, which remains at the bottom of the wastewater treatment device 100. The solid waste is processed, for example, by a rotating blade for scraping and breaking the solid waste into smaller pieces, which may be discharged as dry debris through a discharge opening provided at the bottom of the wastewater treatment device 100 and collected in a dust collection box positioned beneath the wastewater treatment device 100. Consequently, users only need to periodically empty the dust collection box of dry debris, eliminating the need to remove the wastewater treatment device 100 and to dispose the wastewater.

Additionally, the docking station includes a clean water generation device 200, tasked with generating clean water from water vapor, which may be based on one or more of condensation and moisture absorption mechanisms. Consequently, the clean water generation device 200 may receive the water vapor produced by the distillation of the wastewater in the wastewater treatment device 100 and/or the water vapor originated from the moisture in the air, which may be used as sources of water vapor for generating clean water. This process results in the creation of clean water, which is then stored in the clean water tank or supplied to the cleaning robot, as mentioned above. In this manner, the wastewater generated from the process of washing the mopping pads and ambient humidity are effectively utilized, allowing users to forgo the disposal of wastewater and manual addition of clean water, thus achieving an efficient recycling of water resources and reducing the operational burden on the user.

It should be noted that FIG. 1 only illustrates the main components of the docking station, such as the clean water generation device 200 and the wastewater treatment device 100 in a schematic way, however, the docking station may also incorporate other structures or components not depicted in FIG. 1. In addition, the structures and connections shown in FIG. 1 are exemplary and alternative configurations may also be used. The present disclosure does not limit the details of the structures and their interconnections for the docking station.

Although the distillation process may produce hot steam that is subsequently condensed to create purified liquid water, there is a challenge associated with the disposal of solid waste left after the wastewater has been evaporated. For example, when the wastewater dries up, the solid waste remains at the bottom of the wastewater tank (which is also referred to as an evaporation dish). The solidified waste may be relatively hard and thick, and may not be entirely removable by the rotating blade, potentially blocking the discharge opening of the wastewater tank, which is designed for the discharge of solid waste. This may lead to the obstruction of the discharge path of the dry debris, affecting the efficiency of waste removal and may trigger a product fault. In this case, users are compelled to manually inspect the bottom of the wastewater tank to clear the blockage or return the docking station to the service center for maintenance (e.g., if users have no access to the inside of the wastewater tank), thereby causing inconvenience.

Further, a mechanical opening/closing device may be adopted, which operates in conjunction with a mechanism capable of being actuated, to clear the solidified waste obstructing the discharge opening of the wastewater tank. For example, in case that the mechanism is implemented as a telescopic device, the mechanical opening/closing device may operate horizontally in conjunction with the telescopic device that operates vertically, to clear the solidified waste.

The mechanical opening/closing device is exemplified by a valve element at a position corresponding to the discharge opening, and the valve element is operable between an open state for uncovering the discharge opening and a closed state for covering the same. The telescopic device is exemplified by a telescopic mechanism movable between a retracted position and an extended position. For example, the valve element is mounted on an external bottom surface of the wastewater tank, and the telescopic mechanism is disposed above the discharge opening inside the wastewater tank or disposed below the discharge opening outside the wastewater tank, and movable vertically between the retracted position and the extended position. To efficiently prevent the discharge opening from being blocked by the solidified waste generated from the distillation of wastewater, the telescopic mechanism is controlled to transition from the retracted position to the extended position while the valve element is in the open state, thereby breaking through the solidified waste formed at the discharge opening of the wastewater tank.

In this manner, the valve element may be maintained in the closed state and the telescopic mechanism may be maintained in the retracted position when not discharging solid waste, preventing leakage of wastewater and maintaining the sealing. Once the wastewater has evaporated and solidified waste is formed and there is a need to discharge the solid waste, the valve element may be switched to the open state and the telescopic mechanism may be extended to its full length at the extended position, to break up the solidified waste at the valve element, allowing the dry debris, such as the solidified waste which has been crushed by the rotating blade, to be collected into the dust collection box through the unobstructed discharge opening, thus avoiding blockages that would prevent the discharge of dry debris.

To sum up, a wastewater treatment device comprises a device for discharging the solid waste, which usually comprises a telescopic rod driven by a driver (such as a motor) along a linear direction. The telescopic rod is aligned with the discharge opening, so that it may be driven to move into and out of the discharge opening periodically or whenever needed, to push the solid waste in the discharge opening out. Such wastewater treatment device may have many parts, a complex structure and high cost. Besides, in order to avoid interference between the telescopic rod and the blade used in the wastewater treatment device, it is necessary to regulate the movement of the telescopic rod. Such a wastewater treatment device includes a complex structure and are costly. In this case, there is still a need for a simple and low-cost solution for discharging the solid waste from the wastewater tank.

The present disclosure provides a wastewater treatment device used in a docking station for a cleaning robot, which realizes solid waste discharge in a simple and effective manner.

Figure 2:
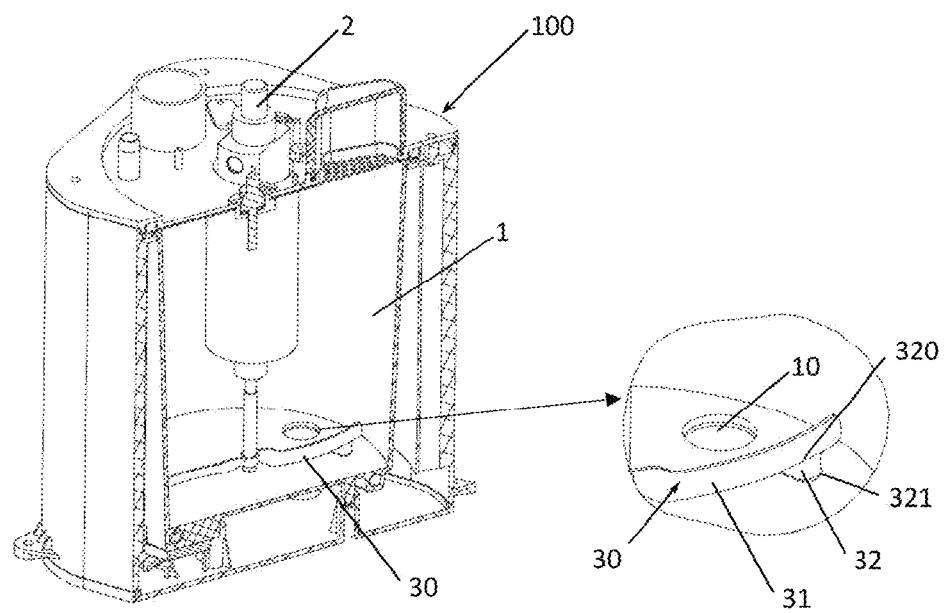
FIG. 2 shows a view of a wastewater treatment device according to the embodiment of the present disclosure.
Figure 3:
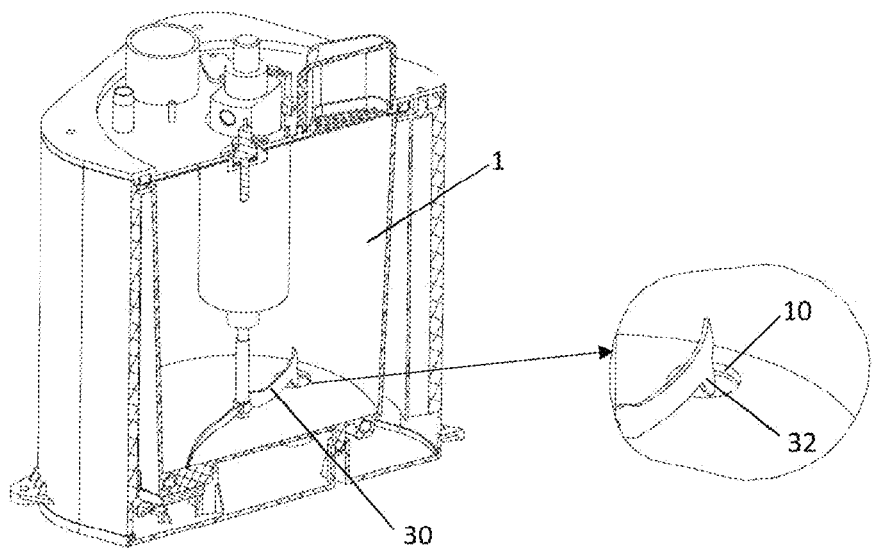
FIG. 3 shows another view of a wastewater treatment device according to the embodiment of the present disclosure.

Referring to an embodiment shown in FIGS. 2-3, the wastewater treatment device 100 comprises a wastewater tank 1, an actuator 2 and a blade 30 being actuated by the actuator 2 to rotate in the wastewater tank 1.

Specifically, the wastewater tank 1 has a discharge opening 10 at its bottom. The discharge opening 10 may be communicate with a solid waste collection tank (not shown) of the docking station. The discharge opening 10 may comprise a valve (not shown), to close the discharge opening 10 when water evaporation is ongoing, and to open the discharge opening 10 when solid waste needs to be discharged. The actuator 2 comprises, for example, any suitable motor, transmission mechanism (if any), etc., so that the blade 30 may be coupled to and actuated by the actuator 2 to rotate in the wastewater tank for scraping waste on the bottom of the wastewater tank 1.

For example, according to the embodiment of FIGS. 2-3, the wastewater treatment device 100 comprises two blades. According to a variant of FIG. 4, the wastewater treatment device 100 comprises three blades. Of course, only one blade or more than three blades may be provided according to actual needs.

Further, the blade 30 comprises an accessory part 32, which is pressed to a first position when contacting the bottom of the wastewater tank 1 (as shown in the enlarged view of FIG. 2), and elastically biased to a second position extending into the discharge opening 10 of the wastewater tank 1 (as shown in the enlarged view of FIG. 3) when located in the discharge opening 10. It should be understood that, the term "elastically biased" means that accessory part may be biased, or to say actuated, by an elastic force, so as to extend into the discharge opening; for example, the accessory part may be biased by an elastic force from the accessory part per se (such as the accessory part 32 in the embodiment described with respect to FIGS. 2-5), or the accessory part may be biased by another component like a spring (such as the accessory part 35 in the embodiment described with respect to FIG. 6). It should be understood that although each blade 30 comprises an accessory part 32 in the embodiments of FIGS. 2-4, the accessory part 32 may be provided on any one or some of the blades according to actual needs.

By providing such an accessory part 32 on the blade 30, when the solid waste is scraped by the blade 30, the accessory part 32 moves on the bottom surface of the wastewater tank 1 together with the blade 30, so the accessory part 32 does not interfere with the rotation of the blade 30. When the accessory part 32 moves to the discharge opening 10, since it may be elastically biased to the second position extending into the discharge opening 10, the accessory part 32 will act on the solid waste in the discharge opening 10, so as to push the solid waste downward away from the discharge opening 10 and prevent the solid waste from blocking the discharge opening 10.

Compared with the solution where solid waste is pushed by a telescopic rod, automatic waste pushing of the present disclosure is realized by simply disposing the accessory part 30 on the blade 30, which not only has low cost, but also eliminates the complicated structure and motion control for the telescopic rod.

Further, the blade 30 may be made of elastic material, and the accessory part 32 is configured as an extension part extending from a body 31 of the blade 30. As shown in FIGS. 2 and 3, since both the blade 30 and the accessory part 32 extending from the body 31 are made of elastic material, the accessory part 32 may be elastically deformed (particularly, the deformation occurs at a heel portion 320 connected between the accessory part 32 and the body 31 of the blade 30) when contacting the bottom surface of the wastewater tank 1, that is, the accessory part 32 is pressed to the first position. At this time, the accessory part 32 has elastic potential energy due to the elastic deformation. As the blade 30 rotates, when the accessory part 32 arrives at the discharge opening 10, the accessory part 32 will release its elastic potential energy, so that its elastic deformation will be restored, and the accessory part 32 will be biased to the second position.

The elastic material may be, for example, any suitable rubber or polymer material. In addition, according to an embodiment not shown, the blade may have a frame (e.g., a metal frame), and the elastic material may be overmolded on the frame. Such blade has a greater rigidity to scrape the solid waste.

Figure 4:
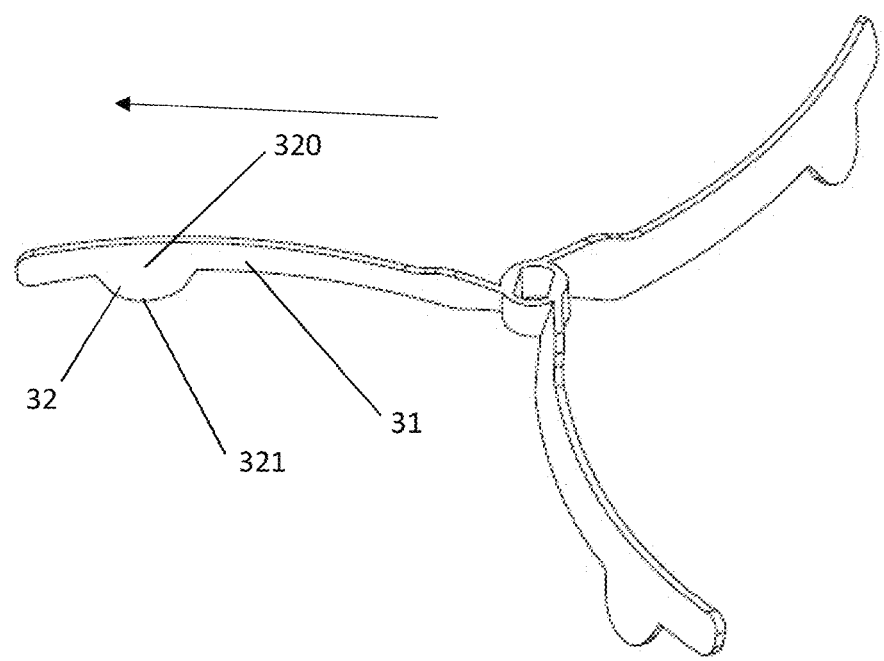
FIG. 4 shows a variant of a blade according to the present disclosure.

Further referring to the embodiment shown in FIGS. 2-4, in addition to the heel portion 320 connected to the body 31, the accessory part 32 also has an end portion 321 away from the heel portion 320. From the heel portion 320 to the end portion 321, the accessory part 32 has a width along the extending direction of the main body 31 (generally indicated by the arrow in FIG. 4), and the width gradually decreasing. For example, the accessory part 32 may have a partially circular shape or a partially elliptical shape. The accessory part 32 may have a thickness same as that of the body 31 of the blade 30, for example.

Figure 5:
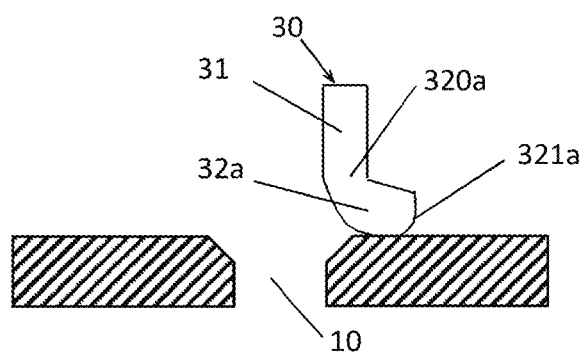
FIG. 5 shows a cross-section view of variant of an accessory part according to the present disclosure.

Referring to a variant of the accessory part shown in FIG. 5, the shape of the accessory part is further changed. Specifically, an accessory part 32a has a heel portion 320a connected to the body 31 and an end portion 321a away from the heel portion 320a. The accessory part 32a has a thickness gradually increasing from the heel portion 320a to the end portion 321a. That is, the heel portion 320a of the accessory part 32a has a minimum thickness, while the end portion 321a has a maximum thickness. Compared with the embodiments of FIGS. 2-4, the accessory part 32a has a larger volume, which may cover a larger area of the discharge opening 10, and may exert a greater pushing force on the solid waste to achieve a thorough waste cleaning effect. Further, the accessory part 32a may have a width along the extending direction of the body 31 (i.e., along the direction perpendicular to the page of FIG. 5), and the width gradually increases from the heel portion 320a to the end portion 321a, which will further increase the volume of the accessory part 32a.

In addition, for the embodiments in FIGS. 2-5, the end portions 321, 321a of the accessory parts 32, 32a may be rounded to reduce the contact area when the end portions 321, 321a contact the bottom surface of the wastewater tank 1, so as to reduce the frictional resistance to the blade movement, and at the same time enable the end portions 321, 321a to leave the discharge opening 10 smoothly. Further, for all the above embodiments, an edge of the discharge opening 10 that contacts the accessory part 32, 32a and 35 may be chamfered or rounded.

In the aforementioned embodiment, since the accessory part undergoes repeated cycles of elastic deformation and recovery, problems such as fatigue fracture or permanent deformation may occur at the heel portion of the accessory part after working for long period of time. Therefore, FIG. 6 shows another variant of the accessory part according to the present disclosure, and this variant proposes an accessory part which has better stability and longer service life, although its structure may be complicated than those of the previous embodiments.

Specifically, the blade 30 may comprise a pocket 34 (e.g., a cylindrical pocket, which may be a portion integrally molded with the body 31 of the blade 30), an accessory part 35 is configured as a plunger disposed in the pocket 34, and a spring 36 is disposed between the top wall of the pocket 34 and a first surface 351 of the accessory part 35, so that the spring 36 is compressed when the accessory part 35 is in the first position, and the accessory part 35 is biased to the second position by the spring 36 when the accessory part 35 is in the discharge opening 10.

Further, the accessory part 35 may further comprise a protrusion 353 disposed on a second surface 352 and protruding toward the bottom of the wastewater tank 1. The second surface 352 is opposite to the first surface 351. The protrusion 353 may have a partial spherical shape (e.g., hemispherical shape), so as to further reduce the contact area with the bottom surface of the wastewater tank 1. In addition, the accessory part 35 may be integrally formed with the protrusion 353 or they may be separately formed and then connected together (for example, by screwing, bonding, welding, etc.). The protrusion 353 may be made of metal material with a smooth surface or made of self-lubricating polymer to further reduce friction.

Figure 6:
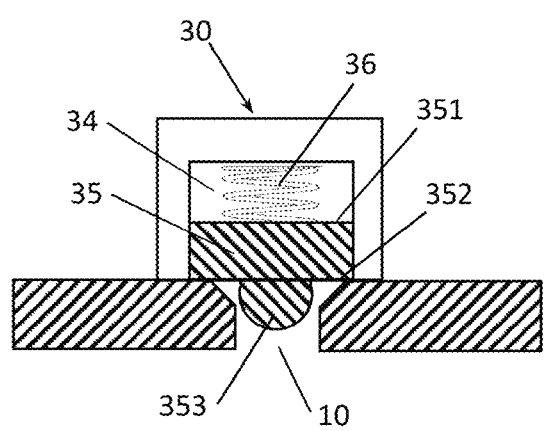
FIG. 6 shows a cross-section view of another variant of the accessory part according to the present disclosure.

Further, the accessory part 35 may have a cylindrical shape, and the diameter of the accessory part 35 is larger than that of the discharge opening 10, as shown in FIG. 6, so as to play a role of limiting the movement of the accessory part 35. Specifically, when the accessory part 35 is elastically biased into the discharge opening 10, the accessory part 35 will be blocked on the edge of the discharge opening 10, so that the accessory part 35 will not be fully inserted and caught within the discharge opening 10. Of course, other limiting structures for limiting the stroke of the accessory part 35 may be adopted.

The principle of the present disclosure has been described above through various embodiments which incorporate the accessory part on the blade that may be biased to automatically clean the solid waste in the discharge opening when the blade moves to the discharge opening. In other words, the present disclosure provides a passive waste cleaning mechanism, which may clean the solid waste in the discharge opening through elastic bias of the accessory part between the first position and the second position. Compared with the prior art, the present disclosure provides a simpler and more efficient solid waste cleaning means.

It should be understood that, other variations may be made according to the principle of the present invention. For example, according to a not-shown embodiment, an elastically deformable accessory part may be provided at the edge of the discharge opening of the waste water tank, so that when a blade moves onto the accessory part, the accessory part is pressed down toward the discharge opening by the blade to clean the solid waste in the discharge opening, and meanwhile the accessory part is elastically deformed; when the blade moves away from the accessory part, the elastic deformation of the accessory part is recovered and the accessory part moves away from the discharge opening.

In addition, the present disclosure also provides a docking station for a cleaning robot, which comprises the wastewater treatment device as described above. The wastewater treatment device comprises: a wastewater tank, comprising a discharge opening at its bottom; an actuator; a blade, being actuated by the actuator to rotate in a wastewater tank; wherein the blade has an accessory part, the accessory part being pressed to a first position when contacting with the bottom of the wastewater tank, and being elastically biased to a second position extending into the discharge opening of the wastewater tank when located in the discharge opening.

Further, the present disclosure also provides a cleaning system, comprising a cleaning robot (not shown), and a docking station for the cleaning robot. The docking station comprises the wastewater treatment device as described above. The wastewater treatment device comprises: a wastewater tank, comprising a discharge opening at its bottom; an actuator; a blade, being actuated by the actuator to rotate in a wastewater tank; wherein the blade has an accessory part, the accessory part being pressed to a first position when contacting with the bottom of the wastewater tank, and being elastically biased to a second position extending into the discharge opening of the wastewater tank when located in the discharge opening.

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A wastewater treatment device for a docking station for a cleaning robot, the wastewater treatment device comprising:
   a wastewater tank, comprising a discharge opening at its bottom;
   an actuator;
   a blade, being actuated by the actuator to rotate within the wastewater tank in a plane substantially parallel with a bottom of the wastewater tank;
   wherein the blade comprises an accessory part arranged transversely to a body of the blade, the accessory part being pressed to a first position when contacting with the bottom of the wastewater tank, and being elastically biased to a second position extending into the discharge opening of the wastewater tank when located in the discharge opening.

2. The wastewater treatment device according to claim 1, wherein the blade is made of elastic material, and the accessory part is configured as an extension part extending from the body of the blade.

3. The wastewater treatment device according to claim 2, wherein the accessory part has a heel portion connected with the body and an end portion away from the heel portion, and the accessory part has a width along an extending direction of the body and the width gradually decreases from the heel portion to the end portion.

4. The wastewater treatment device according to claim 2, wherein the accessory part has a heel portion connected with the body and an end portion away from the heel portion, and the accessory part has a thickness gradually increasing from the heel portion to the end portion.

5. The wastewater treatment device according to claim 4, wherein the accessory part has a width along an extending direction of the body and the width gradually increases from the heel portion to the end portion.

6. The wastewater treatment device according to claim 3, wherein the end portion is rounded.

7. The wastewater treatment device according to claim 1, wherein the blade comprises a pocket, the accessory part is configured as a plunger disposed in the pocket, and a spring is disposed between a top wall of the pocket and a first surface of the accessory part, so that the spring is compressed when the accessory part is in a first position, and the accessory part is biased to the second position by the spring when the accessory part is in the discharge opening.

8. The wastewater treatment device according to claim 7, wherein the accessory part comprises a protrusion disposed on a second surface and protruding toward the bottom of the wastewater tank, wherein the second surface is opposite to the first surface.

9. The wastewater treatment device according to claim 8, wherein the protrusion has a partial spherical shape.

10. The wastewater treatment device according to claim 8, wherein the accessory part has a cylindrical shape, and the diameter of the accessory part is larger than that of the discharge opening.

11. The wastewater treatment device according to claim 1, wherein an edge of the discharge opening that contacts the accessory part is chamfered or rounded.

12. A docking station for a cleaning robot, comprising:
   a wastewater treatment device, comprises:
      a wastewater tank, comprising a discharge opening at its bottom;
      an actuator;
      a blade, being actuated by the actuator to rotate within the wastewater tank in a plane substantially parallel with a bottom of the wastewater tank;
      wherein the blade comprises an accessory part arranged transversely to a body of the blade, the accessory part being pressed to a first position when contacting with the bottom of the wastewater tank, and being elastically biased to a second position extending into the discharge opening of the wastewater tank when located in the discharge opening.

13. The docking station according to claim 12, wherein the blade is made of elastic material, and the accessory part is configured as an extension part extending from a body of the blade.

14. The docking station according to claim 13, wherein the accessory part has a heel portion connected with the body and an end portion away from the heel portion, and the accessory part has a width along an extending direction of the body and the width gradually decreases from the heel portion to the end portion.

15. The docking station according to claim 12, wherein the blade comprises a pocket, the accessory part is configured as a plunger disposed in the pocket, and a spring is disposed between a top wall of the pocket and a first surface of the accessory part, so that the spring is compressed when the accessory part is in a first position, and the accessory part is biased to the second position by the spring when the accessory part is in the discharge opening.

16. The docking station according to claim 15, wherein the accessory part comprises a protrusion disposed on a second surface and protruding toward the bottom of the wastewater tank, wherein the second surface is opposite to the first surface.

17. A cleaning system, comprising:
   a cleaning robot;
   a docking station for the cleaning robot, comprising:
      a wastewater treatment device comprises:
         a wastewater tank, comprising a discharge opening at its bottom;
         an actuator;
         a blade, being actuated by the actuator to rotate within the wastewater tank in a plane substantially parallel with a bottom of the wastewater tank;
         wherein the blade comprises an accessory part arranged transversely to a body of the blade, the accessory part being pressed to a first position when contacting with the bottom of the wastewater tank, and being elastically biased to a second position extending into the discharge opening of the wastewater tank when located in the discharge opening.

18. The cleaning system according to claim 17, wherein the blade is made of elastic material, and the accessory part is configured as an extension part extending from a body of the blade.

19. The cleaning system according to claim 18, wherein the accessory part has a heel portion connected with the body and an end portion away from the heel portion, and the accessory part has a width along an extending direction of the body and the width gradually decreases from the heel portion to the end portion.

20. The cleaning system according to claim 17, wherein the blade comprises a pocket, the accessory part is configured as a plunger disposed in the pocket, and a spring is disposed between a top wall of the pocket and a first surface of the accessory part, so that the spring is compressed when the accessory part is in a first position, and the accessory part is biased to the second position by the spring when the accessory part is in the discharge opening,
   wherein the accessory part comprises a protrusion disposed on a second surface and protruding toward the bottom of the wastewater tank, wherein the second surface is opposite to the first surface.

\* \* \* \* \*